(No Model.) 5 Sheets—Sheet 1.

A. M. BUTZ.
AUTOMATIC TEMPERATURE CONTROLLER.

No. 390,281. Patented Oct. 2, 1888.

Witnesses.
S. J. Beardslee.
J. Jessen

Inventor.
Albert M. Butz.
By A. C. Paul, atty.

(No Model.) 5 Sheets—Sheet 2.
A. M. BUTZ.
AUTOMATIC TEMPERATURE CONTROLLER.
No. 390,281. Patented Oct. 2, 1888.

*Fig. 11.* *Fig. 13.* *Fig. 12.*

Witnesses.
S. J. Beardslee.
J. Jessen.

Inventor:
Albert M. Butz.
By A. C. Paul atty.

(No Model.) 5 Sheets—Sheet 3.

A. M. BUTZ.
AUTOMATIC TEMPERATURE CONTROLLER.

No. 390,281. Patented Oct. 2, 1888.

Witnesses,
S. J. Beardslee.
J. Jessen.

Inventor.
Albert M. Butz.
By A. C. Paul atty.

(No Model.) 5 Sheets—Sheet 4.

A. M. BUTZ.
AUTOMATIC TEMPERATURE CONTROLLER.

No. 390,281. Patented Oct. 2, 1888.

Witnesses.
S. J. Beardslee.
J. Jessen

Inventor.
Albert M. Butz.
By A. C. Paul atty.

(No Model.) 5 Sheets—Sheet 5.
A. M. BUTZ.
AUTOMATIC TEMPERATURE CONTROLLER.
No. 390,281. Patented Oct. 2, 1888.
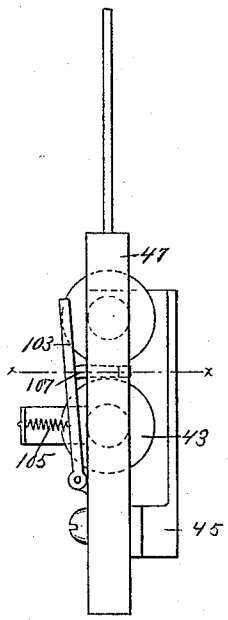
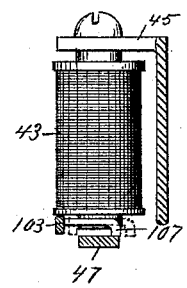
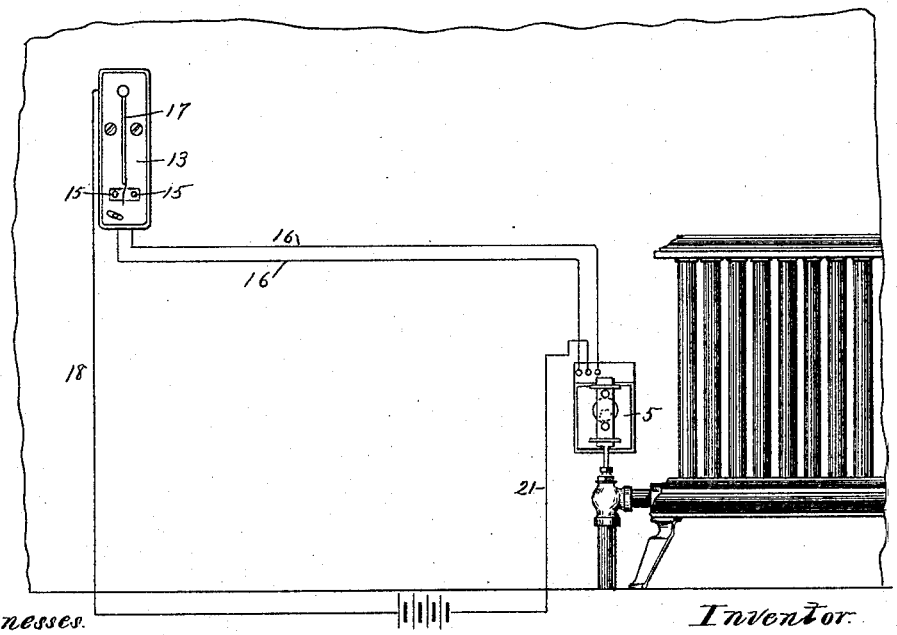
Witnesses.
S. J. Beardslee.
J. Jessen
Inventor.
Albert M. Butz.
By A. C. Paul atty.

UNITED STATES PATENT OFFICE.

ALBERT M. BUTZ, OF MINNEAPOLIS, MINNESOTA, ASSIGNOR TO THE BUTZ THERMO-ELECTRIC REGULATOR COMPANY, OF SAME PLACE.

AUTOMATIC TEMPERATURE-CONTROLLER.

SPECIFICATION forming part of Letters Patent No. 390,281, dated October 2, 1888.

Application filed September 6, 1887. Serial No. 248,926. (No model.)

*To all whom it may concern:*

Be it known that I, ALBERT M. BUTZ, of Minneapolis, in the county of Hennepin and State of Minnesota, have invented certain new and useful Improvements in Heat-Regulators, of which the following is a specification.

My invention relates to that class of regulators in which a thermostat is arranged in the room or apartment whose temperature is to be controlled, and is connected by electric circuits with a suitable motor that controls the drafts of a furnace or heater by means of which heat is supplied to the apartment, or controls valves that in other ways regulate the temperature of the room.

My invention relates more particularly to improvements in the motor by which the temperature-controlling valve or valves are operated.

One object of my invention is to provide a spring-motor with a circuit-breaker that at a predetermined point in the operation of the motor will open the electric circuit and prevent further operation of the device until the motor has been rewound.

Another object of the invention is to provide the motor with means for showing at all times the condition of the spring and which will indicate when it needs rewinding.

Another object of the invention is to simplify the construction of the electro-magnetic releasing and stopping device and to provide means for accurately adjusting it.

Other objects of the invention will appear from the following detailed description.

Figure 1:
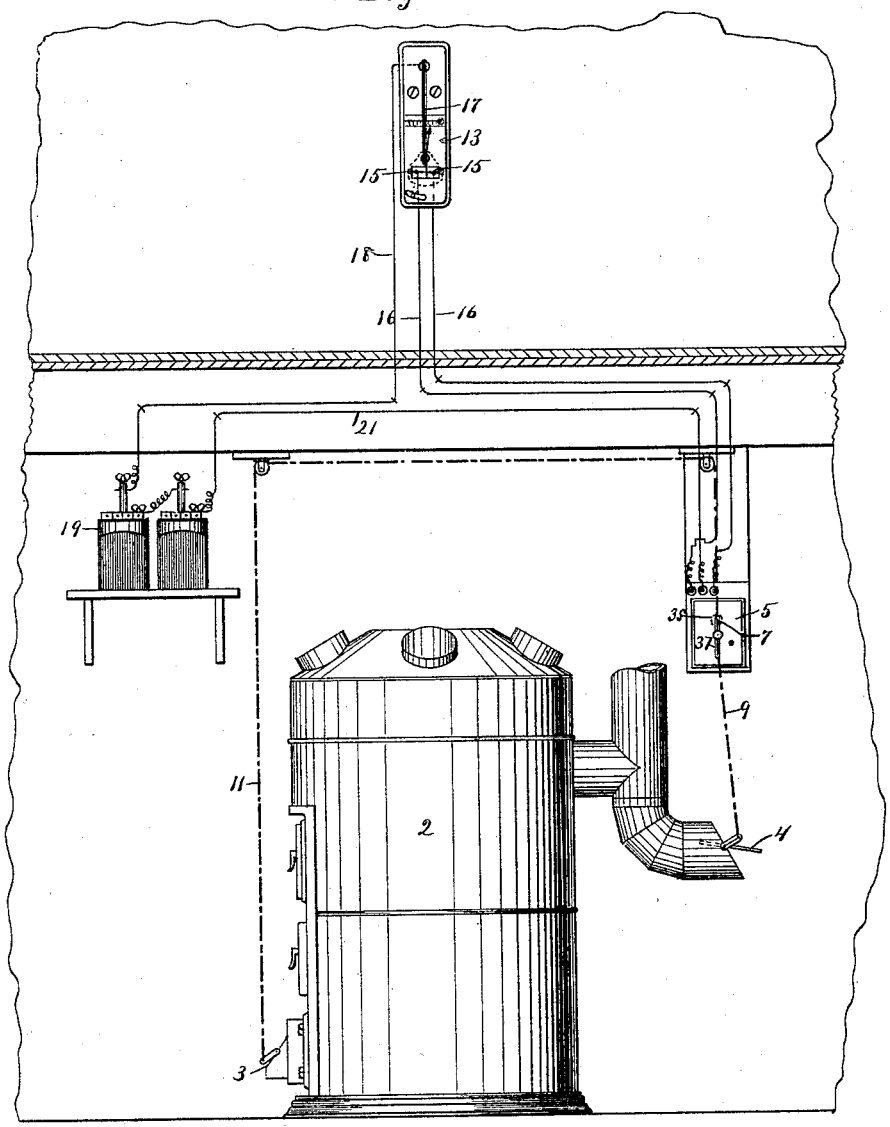
Figure 2:
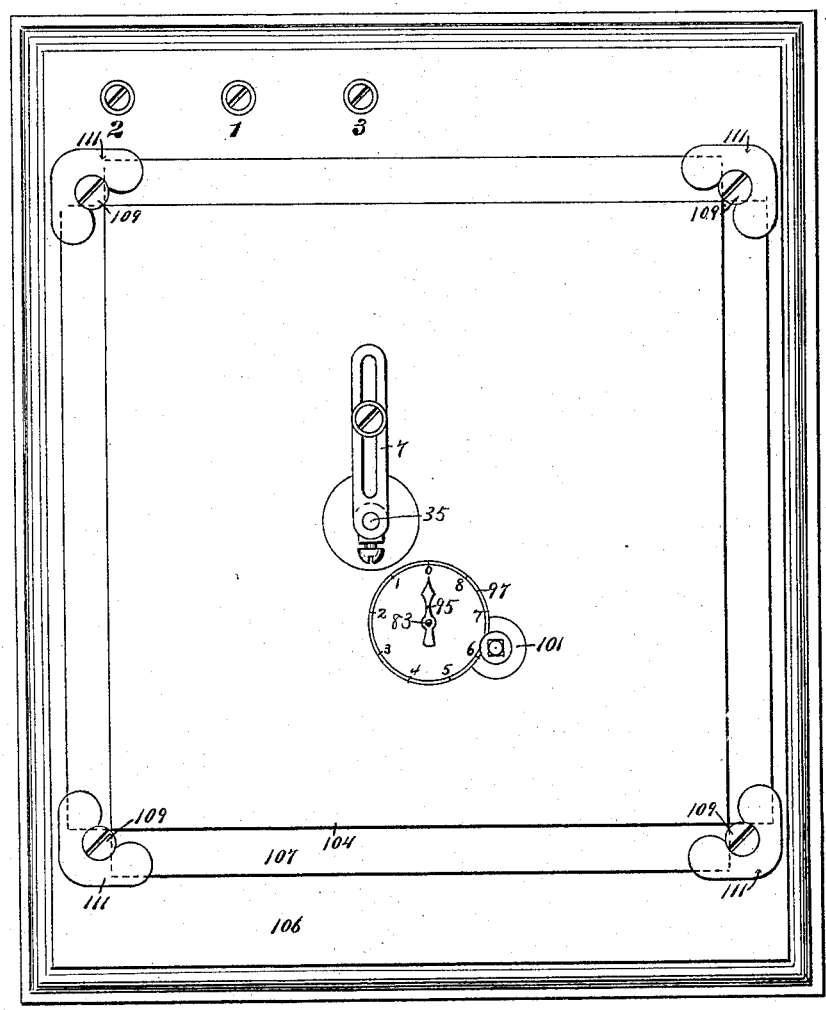
Figure 2:
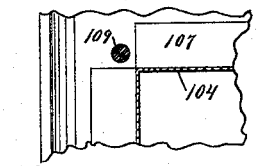
Figure 2:
Figure 2:
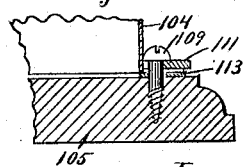
Figure 3:
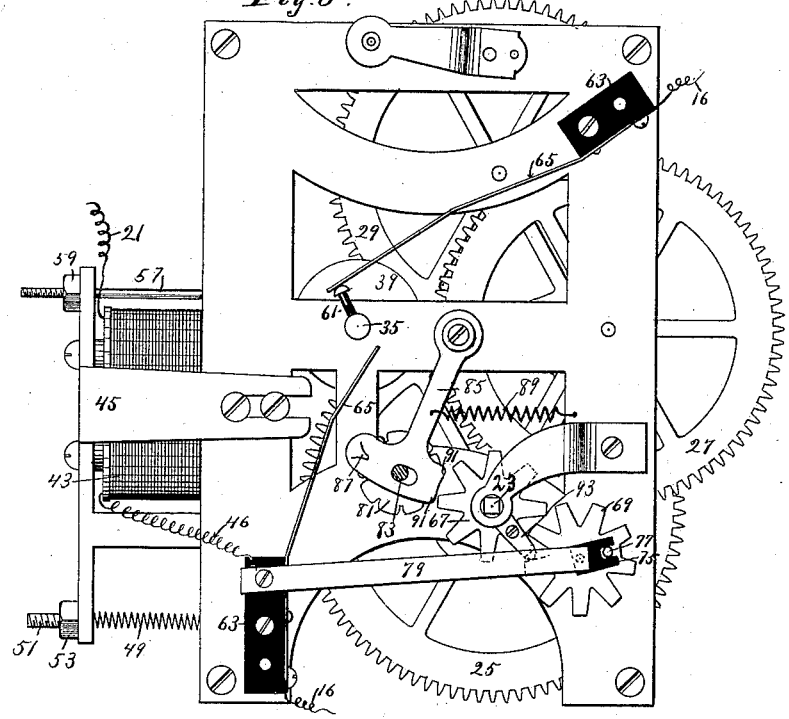
Figure 4:
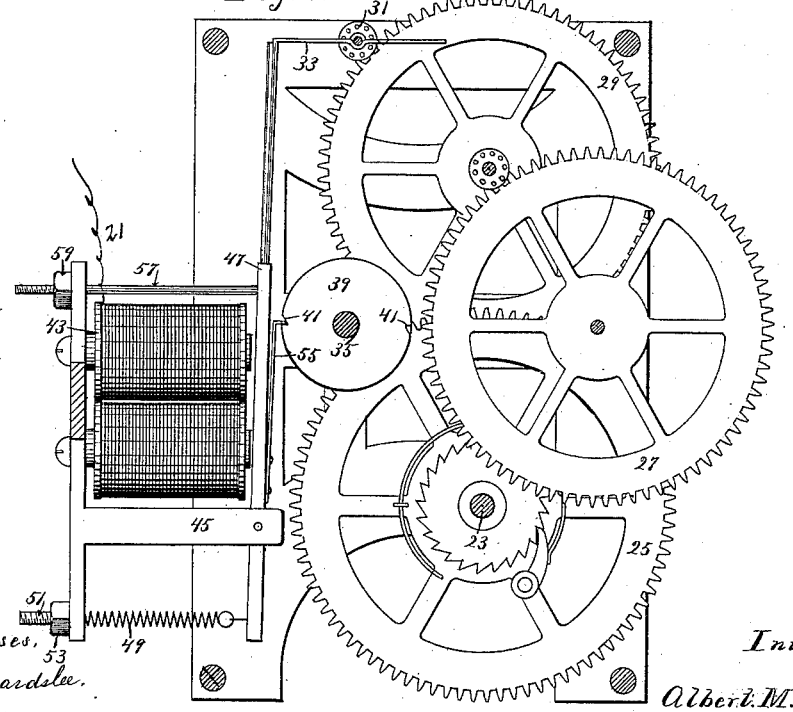
Figure 5:
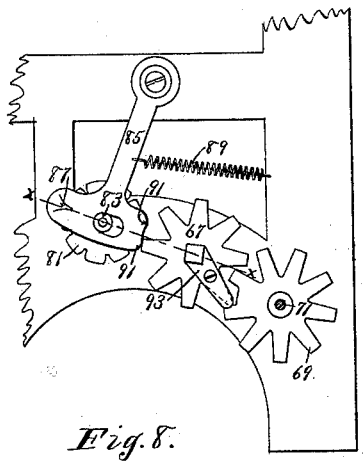
Figure 6:
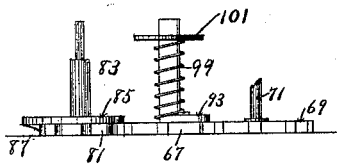
Figure 8:
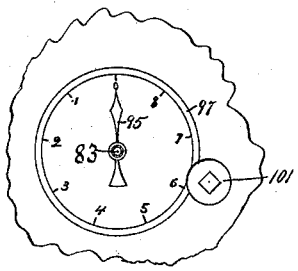
Figure 7:
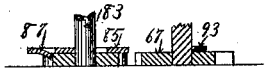
Figure 9:
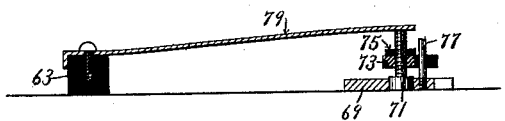
Figure 10:
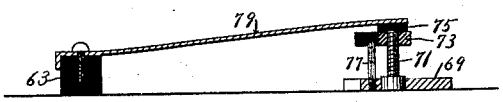

In the accompanying drawings, forming a part of this specification, Figure 1 is an elevation of a furnace with my heat-regulator applied thereto. Fig. 2 is an elevation, on a larger scale, of the motor with its base and inclosing-case. Fig. 3 is an elevation of the motor with the case removed. Fig. 4 is a sectional elevation of the motor, showing the arrangement of the electro-magnetic releasing and stopping device. Figs. 5, 6, and 7 are details of a portion of the indicating device. Fig. 8 is a detail of a portion of the case, showing the dial and pointer of the indicating device. Figs. 9 and 10 are details of the circuit-breaker for breaking the circuit when the motor has reached a predetermined point in its operation. Figs. 11 and 12 are details of the case and base, illustrating the device for securing the case to the base. Fig. 13 is a detail showing the clamps by which the case is secured. Figs. 14 and 15 are details showing a means of locking the armature and preventing the stop from being released. Fig. 16 is a view showing the application of my device to the valve of a steam-radiator.

This heat-regulator is adapted for use with any kind of heating apparatus, and may be arranged to operate the valves or dampers on the furnace, so as to control the fire which supplies the heat for warming the apartment, or to operate suitable valves in the pipes which convey heated air, steam, or hot water to the apartment to be heated, or it may be arranged to operate suitable ventilating-valves, either separately or in connection with the valves of the heating apparatus. It may be arranged to control the temperature in a dwelling-house, office, store, or other building, or in a railway-car, or in any other room or apartment. The principle and mode of operation are the same in either case. A thermostat are arranged in the room or apartment whose temperature is to be regulated, and is connected by electric circuits with a spring-motor that operates the temperature-controlling valves.

This heat-regulator is an improvement on that shown and described in the patent to J. M. Bradford, No. 222,234, dated December 2, 1879, and that shown and described in my former patent, dated August 24, 1886.

In Fig. 1 of the drawings, 2 represents a suitable furnace or heater, which may be of any ordinary construction, and is provided with a front damper, 3, and a check-damper, 4.

5 represents a spring-motor located at a convenient point. It is provided with an operating crank, 7, which is connected by cords or chains 9 and 11 with the dampers 3 and 4. If preferred, the motor may be arranged to operate only a single damper on the furnace. These dampers are preferably arranged so that when one is opened the other is closed. They therefore balance each other, and may be very easily moved. As shown in Fig. 1, the front or draft damper is closed and the check-damper is open. A half-revolution of the crank-shaft of the motor will cause the check-damper to close and the front damper to open.

13 represents a suitable thermostat that is adapted to be arranged in any room or apartment whose temperature is to be controlled. It is provided with contact-points 15, which are connected by means of the circuit-wires 16 with the motor 5. It is also provided with a thermostatic bar, 17, which is connected by the wire 18 with a suitable open-circuit battery, 19. The wire 21 connects the other pole of the battery with the motor 5. The thermostatic bar 17 is composed, preferably, of rubber and metal or other materials which expand or contract unequally with the variations of temperature. The bar may be bent, therefore, either to the right or to the left, and may come in contact with either of the points 15. When the temperature rises above the desired degree, the bar will come in contact with one of the points 15. An electric circuit will then be closed through one of the wires 16, the motor, the wire 21, the battery, and the wire 18. The electro-magnetic releasing device will be operated, and will allow the motor to make a half-revolution, thereby opening the check-damper 4 and closing the front damper, 3. When the temperature falls below the desired degree, the circuit through the other wire 16 will be closed, the motor will make another half-revolution, the front damper will be opened, and the check-damper will be closed.

The motor 5 is provided with a spring-shaft, 23, and with a suitable train of gears, 25 27 29 31, and a fly-wheel, 33. It is also provided with a main shaft, 35, which is preferably driven directly from the gear 25 on the spring-shaft 23. The crank 7, to which the chains or cords that operate the dampers are attached, is secured upon the shaft 35.

The shaft 35 is provided with a suitable disk, 39, having notches 41 in its periphery. An electro-magnet, 43, is secured upon the frame of the motor, and is connected with the wire 21, that extends from the battery to the motor. The electro-magnet is preferably secured in a metallic frame, 45, that is fastened adjustably upon the main frame of the motor. A lever, 47, is pivoted in the frame 45, and its lower end is provided with a spring, 49, one end of which is connected with the lever and the other end with the stationary frame 45. The end of the spring 49 is preferably connected with the threaded rod 51, upon which is arranged a nut, 53, bearing against the frame 45. By adjusting the nut 53 the tension of the spring 49 will be regulated. The spring 49 throws the upper end of the lever 47 outward from the magnet 43 into the path of the fly-wheel 33. This lever, therefore, acts as a stop for this fly-wheel and the entire train of gears. The lever extends up in front of the magnet 43 and forms an armature therefor. A spring, 55, is secured upon the lever 47, and is provided with a projecting end, which is adapted to engage either of the notches 41 in the disk 39. The operation of this releasing device is as follows. When an electric current passes through the coil of the magnet 43, its soft-metal core is magnetized and draws the lever 47 toward it, carrying the spring 55 out of the notch 41 and the upper end of the lever 47 away from the fly 33. When the circuit is broken, the spring 49 tends to return the lever to its former position. This cannot be done, however, until the shaft 35 has made a half-revolution and the spring 55 has come opposite the next notch 41, as during the half-revolution of the shaft 35 the end of the spring 55 bears upon the edge of the disk 39 and holds the lever out of the path of the fly-wheel. When the shaft 35 has made a half-revolution, the end of the spring 55 drops into the next notch 41 and the lever is brought into position to be engaged by the fly. It then acts as a stop for the motor, and holds the train stationary until another electric impulse has been sent through the electro-magnet 43 and the lever 47 again drawn toward that magnet. I prefer to provide the lever 47 with a rod, 57, having a threaded end extending through a slot in the frame 45. A nut, 59, is arranged upon this rod, and by it the distance that the lever 47 may be thrown toward the fly by the spring 49 may be determined.

The electro-magnet 43, which, as hereinbefore stated, is electrically connected with the wire leading from the battery to the motor, is also electrically connected with the shaft 35, preferably in the manner hereinafter described. This shaft is provided with a contact point or cam, 61. Blocks 63, of insulating material, are secured upon the frame of the machine, and upon each of these blocks is secured a contact spring, 65, extending toward the shaft 35. One of the springs is electrically connected with one of the wires 16 leading from the thermostat to the motor and the other with the other wire. When the train is at rest, the pin 61 is in contact with one of the springs 65. When the shaft makes a half-revolution, as hereinbefore described, the pin is brought in contact with the other spring.

The operation of the device is substantially as follows: The thermostat being located in the room whose temperature is to be governed, and the contact-points being adjusted for the proper degree of temperature, as the temperature rises above the predetermined degree the thermostatic bar will come in contact with one of the contact-points 15. The circuit will then be completed from the battery through wire 18, the thermostat, the wire 16, the spring 65 on the motor, the pin 61, the shaft 35, the frame-work of the machine, the electro-magnet 43, and the wire 21 to the battery. The motor-train will then be released in the manner already described, and the shaft 35 will make a half-revolution. When the pin 61 moves away from the spring 65, the circuit will be broken at that point. When the pin 61 comes in contact with the other spring 65, the other circuit will be put into condition to be closed at the thermostat. It will be seen that the electric current is therefore used only for a moment at each time the motor is started, and that the battery-power is therefore economized to the highest degree. It will also be seen that as the circuit is broken between the pin 61 and the spring 65 the breaking of the circuit at the thermostat and the sparking and corroding of its delicate contact-points are entirely avoided.

It might occur in some instances that the motor would be allowed to run down, so that when the circuit was closed there would not be power enough in the spring to revolve the shaft 35 and cause the pin to move away from the spring 65 and break the circuit. If this should occur and the circuit were not broken, the battery-power would be soon used up, and the battery would become polarized and rendered inoperative and useless. In order to avoid this, I provide the motor with a circuit-breaking device connected with its train of gears and arranged to be operated at a predetermined point in the operation of the motor to open the circuit and leave it open until the motor is rewound.

I do not confine myself to the details of construction of the circuit-breaking device herein described, as any equivalent device may be substituted, although I consider it a preferable construction for the purpose.

The spring-shaft 23 is provided with a star-wheel, 67, and another star-wheel, 69, is mounted upon a stationary stud, 71, upon the frame of the motor. The stud 71 is screw-threaded above the wheel 69, as shown. A nut, 73, having an insulated top, 75, is arranged upon the threaded portion of the stud 71. A pin, 77, passes through the nut 73 and into the wheel 69. A metallic spring, 79, is secured to the frame of the machine upon a block of insulating material and its free end bears upon the top of the stud 71. The electrical connection from the electro-magnet 43 to the shaft 35 is through a wire, 46, extending from the electro-magnet to the spring 49, thence through the spring 79 and the stud 71 to the metal frame-work of the motor, and thence to the shaft 35. The nut 73 revolves with the star-wheel 69 and moves up and down on the stud 71 as it is revolved. As the motor turns the train of gears, the nut is raised on the stud 71. Before the motor becomes completely run down the nut reaches a point near the top of the stud, the insulated block 75 on the top of the nut presses upon the spring 79 and raises it from the end of the stud, thus opening the circuit at this point. As the spring-shaft is revolved to rewind the spring, the star-wheels are turned in the opposite direction and the nut 73 is moved down the threaded stud and the spring 79 is again allowed to come in contact with the end of the stud. The circuit will therefore be closed at this point until the spring is again raised by the movement of the nut at the top of the stud. This whole device forms a circuit-breaker which breaks the circuit when the motor reaches a predetermined point in its operation.

The star-wheel 67 is preferably provided with one tooth that is longer than the others, and the star-wheel 69 is preferably provided with one short notch between two of its teeth. The wheel 69 has one more tooth or point than the wheel 67. When the long tooth on the wheel 67 comes into the short space on the wheel 69, the motor will be stopped. In Fig. 5 I have shown these wheels in the position which they have when the spring is fully wound. In Fig. 3 I have shown them in the position that they have after the motor has partially run down.

I also prefer to provide the motor with a device that will show whether the spring is fully wound or not and to indicate when it needs rewinding. The construction of this device is preferably as follows: A star-wheel, 81, having a barrel, 83, secured thereto, is mounted on a stationary pin on the frame of the motor in proximity to the star-wheel 67, but far enough from it so that only the long tooth of the star-wheel 67 will engage the wheel 81. A lever, 85, is pivoted upon the frame of the machine, and is provided with a dog or catch, 87, that projects into one of the notches in the wheel 81 and holds the wheel stationary. A spring, 89, tends to hold the lever 85 in position with its dog in engagement with the wheel 81. The lever is provided with a slot through which the barrel 83 passes, and with a double cam-face, 91, on the side toward the star-wheel 67. The wheel 67 has secured to it over its long tooth a plate, 93, the end of which bears against the cam-face 91 as the star-wheel 67 is revolved in either direction and presses back the lever 85, releases the wheel 81, and allows it to be turned one notch by the long tooth of the wheel 67. As soon as the plate 93 passes the lever 85 the wheel 81 is again locked and held stationary until the plate 93 again moves back the lever 85. Upon the outer end of the shaft 83, outside of the motor-casing, is a hand or pointer, 95, and a dial, 97, is arranged on the casing and divided and marked in any suitable way, so that the position of the pointer indicates the condition of the motor-spring. I have here shown a dial divided from 0 to 8, this being the number of times that the pointer will be moved before the motor is stopped by the engagement of the stopping device on the wheels 67 and 69. The dial may of course be divided in any other suitable way.

In some instances if the key by which the motor-spring is wound were left in position on the winding-shaft it might be encountered by the motor-shaft and a short circuit formed, which would cause the battery-power to be wasted. In order to prevent this, I provide a device which automatically throws out the key as soon as it is released by the hand. This device consists, preferably, of a coiled spring, 99, that surrounds the winding-shaft, and a plate, 101, upon said shaft, that is pressed by the spring 99 closely against the inner wall of the motor-casing. When the motor is to be wound, the key is placed on the shaft and the spring 99 compressed as the key is forced into position. When the key is released, the force of the spring pushes the plate 101 against the inner wall of the motor and throws the key off the shaft. This plate also closes the key-hole in the motor-casing and excludes the dirt and dust therefrom.

In some instances it is desirable to provide means for preventing the stop from being jarred away from the fly. This is especially advisable where the regulator is used for controlling the temperature of railway-cars. The device which I prefer to use for this purpose I have shown in detail in Figs. 14 and 15. A second armature, 103, is arranged to move in a plane at right angles to the plane in which the armature 47 moves. The armature 103 is arranged within the field of the magnet 43, so that when an electric current is sent through this magnet both armatures are drawn toward the pole of the magnet in planes at right angles to each other. The armature 103 is normally held away from the pole of the magnet by a spring, 105. The armature 103 also carries a lug, 107, that extends behind the armature 47, or between it and the pole of the magnet, and prevents that armature from being moved toward the magnet until the armature 103 has first been moved toward the magnet and its lug 107 moved away from the armature 47. With this device it will be seen that the armature 47 is locked in position where it is encountered by the fly 33, and that no jarring or shaking motion can move this armature away from the fly.

In Fig. 16 I have shown the regulator applied to the valve of a steam-radiator for the purpose of controlling the admission of steam to the radiator and governing the temperature of the room in this way. The arrangement of the thermostat, battery, and motor is the same as in the other instance and the connecting-wires are run in a similar manner; but the main shaft of the motor is provided with a suitable cam or crank which opens or closes the steam-valve. In a similar manner the motor may be connected with the other temperature-controlling valves. I prefer to provide a wooden base-board, 106, to which mechanism of the motor is secured by any suitable means. Numbered binding-screws may be arranged upon this bar, as shown at the upper part of Fig. 2. A sheet-metal casing, 104, having flanges 107, with triangular spaces between the ends of the flanges, is preferred for inclosing the motor mechanism.

Screws 109 are provided in the base at the corners of the case, and corner clamps, 111, slotted to fit under the heads of the screw, extend over the ends of the flanges and hold the case in place. By the tightening of the screws the clamp may be held firmly in position. Felt packing-strips 113 may be placed between the flanges and the base for the purpose of excluding the dust.

I claim as my invention—

1. The combination, in a heat-regulator, with the thermostat and motor, of two electric circuits connected to said thermostat and motor, a circuit-breaker operated by said motor alternately to break each of said circuits, and an independent circuit-breaker that is operated by said motor to break the electric circuits when the motor has run down to a predetermined point.

2. In a heat-regulator, the combination of a spring-actuated motor provided with a circuit-breaker that is adapted to break alternately the electric circuits connected with said motor, and another circuit-breaker that is operated by said motor and breaks the electric circuits when the motor has run down to a predetermined point and closes it again as the motor is rewound.

3. The combination, in the spring-motor of an electric heat-regulator, of the wheel 67, carried by the spring-shaft on said motor, the wheel 69, meshing therewith, the threaded stud 71, the nut 73, having the insulating-block 75, and the contact-spring 79, forming a part of an electric circuit, whereby the electric circuit is opened when the motor reaches a predetermined point in its operation and is closed as the motor is rewound.

4. In a heat-regulator having the spring-actuated motor, the combination, with the spring-shaft, of the index, a locking device therefor, gearing between said spring-shaft and said index, and a releasing device operated by said gearing and adapted to engage said locking device and hold it out of operation while said index is being moved, for the purpose set forth.

5. The combination, in a spring motor of a heat-regulator, of the spring-shaft, the star-wheel 67 thereon, having one tooth of greater length than the other, and the plate 93, secured to said tooth, the independent shaft 83, wheel 81, adapted to be engaged by the long tooth on wheel 67, the lever 85, having cam-surfaces 91 and pawl 87, and the spring 89, all substantially as described.

In testimony whereof I have hereunto set my hand this 18th day of August, 1887.

ALBERT M. BUTZ.

In presence of—
A. C. PAUL,
J. W. PORTER.